Patented Sept. 3, 1940

2,213,201

UNITED STATES PATENT OFFICE 2,213,201

SYNTHETIC RESIN COMPOSITIONS

Edgar C. Britton and Gerald H. Coleman, Midland, Mich., assignors to The Dow Chemical Company, Midland, Mich., a corporation of Michigan No Drawing. Application August 17, 1938, Serial No. 225,262

16 Claims. (Cl. 260—36)

This invention concerns new synthetic resin compositions comprising resins derived from styrene and, as plasticizing agents therefor, certain halogenated diphenyl aliphatic hydrocarbons.

It is known that solid resinous products may be obtained by polymerizing monomeric styrene together with a variety of other unsaturated organic compounds containing olefinic linkages. For example, Staudinger (U. S. Patent 2,089,444) discloses resinous polymers prepared by the conjoint polymerization of styrene and divinyl benzene. Voss et al. (U. S. Patent 2,047,398) describe similar polymers prepared from styrene and maleic acid derivatives, and in the co-pending applications of Britton et al., Serial No. 191,958, filed February 23, 1938; Serial No. 191,959, filed February 23, 1938; Serial No. 191,960, filed February 23, 1938; Serial No. 199,892, filed April 4, 1938; Serial No. 213,022, filed June 10, 1938; and Serial No. 217,224, filed July 2, 1938 are described products prepared by polymerizing styrene in the presence of certain unsaturated esters and ethers, e. g. triallyl phosphate, allyl crotonate, the dicinnamate of 1.4-dioxanediol-2.3; diallyl phthalate, 2-chlorallyl furoate, allyl methacrylate, trimethallyl phosphate, the dicrotonate of 1.4-dioxanediol-2.3, cinnamyl cinnamate, di-(2-chlorallyl) oxalate, the diallyl ether of 1.4-dioxanediol-2.3, etc.

The above-described products are usually obtained as glass-like, thermoplastic resins, although in some cases they may be obtained as opaque white friable materials which, however, are capable of being molded to form glass-like products. The polymers initially obtained as clear, transparent resins may be soluble in the usual solvents for polystyrene, e. g. carbon tetrachloride, dioxane, methylene chloride, benzene, toluene, ethylbenzene, etc., or they may be capable only of swelling to form insoluble gels when contacted with such solvents. The opaque, white, friable polymers are insoluble and non-swelling in polystyrene solvents. All such solid resinous products are herein referred to as "co-polymers", although their exact chemical structure is not definitely known. Similarly the unsaturated compounds which may be employed in preparing such products are referred to as "co-polymerizing agents," and the polymerization of mixtures of styrene and such agents is referred to as "co-polymerization". All of the co-polymers of styrene possess a number of properties which render them valuable in the manufacture of molded or shaped objects, e. g. stability against discoloration, good dielectric strength, high mechanical strength, impermeability to moisture, resistance to attack by acids and alkalies, etc.

In preparing such molded or shaped objects, however, it is advantageous to incorporate plasticizing or softening agents with the co-polymers for the purpose of increasing flow during molding or for increasing the flexibility, toughness, or resistance to shock, etc. of the finished article. We are aware that a number of materials, e. g. diphenyl methane, diphenyl propane, dixylyl ethane, chlorinated diphenyl, etc., have been suggested as plasticizing agents for polystyrene itself, but most of such agents are unsatisfactory for use with the co-polymers of styrene since they impart the desired properties to the co-polymers only when used in such large proportions as to reduce greatly the tensile strength and heat resistance of the composition. Certain of such known plasticizing agents are further disadvantageous in that they tend to vaporize or exude to the surface of the plasticized composition with resultant loss in plasticizing action and, frequently, blushing of the finished product.

We have now found that certain halogenated diphenyl aliphatic hydrocarbons may be advantageously employed as plasticizing agents for the co-polymers of styrene in preparing compositions useful in the manufacture of molded or shaped objects. Styrene co-polymers plasticized with these new agents are tougher and more resistant to shock than the unplasticized co-polymers, but at the same time they retain their initial high strength characteristics and heat resistance to a much greater degree than do styrene co-polymers plasticized with known plasticizing agents. In some cases, the plasticized co-polymers even show increased tensile strengths because of the improved molding secured through the use of the new plasticizing agents. Moreover, the plasticized compositions are clear and transparent and show less tendency to blush or craze upon aging than do the unplasticized co-polymers.

The halogenated diaryl aliphatic hydrocarbons which are employed as plasticizing agents for the co-polymers of styrene are di-(halophenyl) alkanes having the general formula:

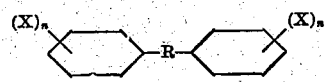

wherein R represents an alkylene radical, X represents chlorine or bromine, and n represents an integer not greater than 5, preferably not greater than 3. Examples of such compounds are di-(2-chlorphenyl-) methane, di-(2.4-dibromphenyl-) butane, di-(2.4.6-tribromophenyl-) octane, di-(2-bromphenyl-) decane, di-(4-chlorphenyl) ethane, di-(3-bromphenyl-) isobutane, di-(3.5-dichlorphenyl-) isopentane, di-(pentachlorphenyl-) methane, etc. These compounds vary in physical characteristics from colorless high-boiling liquids to crystalline solids. They are compatible with styrene co-polymers and may be employed to plasticize the same without excessively reducing tensile strength and heat resistance.

The new plastic compositions comprising styrene co-polymers plasticized with di-(halophenyl-) alkanes are conveniently prepared by polymerizing a mixture of monomeric styrene, a co-polymerizing agent, and the plasticizing agent. The latter may be employed in any proportion within the limits of its compatability with the co-polymer, but is usually employed in an amount representing from 5 to 40 per cent of the entire composition. The most effective amount of plasticizing agent depends somewhat upon the use to which the composition is to be put. The co-polymerizing agents are usually employed in proportions representing from 0.1 to 25 per cent by weight of the styrene, although the optimum amount depends upon the particular co-polymerizing agent employed and upon the properties desired in the composition. The polymerization is usually carried out by heating the mixture of monomeric styrene, plasticizing agent, and co-polymerizing agent at a moderately elevated temperature, e. g. 60° to 180° C. for 3–14 days, during which time the mixture gradually polymerizes to form a clear, transparent, thermoplastic resin having the plasticizing agent homogeneously dispersed throughout. A large amount of heat is developed during polymerization and when operating on a large scale it is advantageous to provide heat dissipating means in order to maintain the desired temperature. If desired, the polymerization may be initiated at a relatively low temperature, e. g. 60° C., and the temperature gradually increased as polymerization proceeds.

Compositions comprising styrene co-polymers which are capable of being swelled by solvents may be prepared by forming the co-polymer in the absence of the plasticizing agent, i. e. by polymerizing a mixture of monomeric styrene and a co-polymerizing agent, and thereafter causing the co-polymer to swell to a gel in a solution of the plasticizing agent in a solvent which is capable of swelling the co-polymer, e. g. benzene, toluene, carbon tetrachloride, etc. During the swelling operation, the plasticizing agent is absorbed by the co-polymer gel, and, after removal of the solvent, the co-polymer is recovered in the form of a granular or fibrous mass containing the plasticizing agent in uniform and intimate dispersion therethrough. This method of incorporating a plasticizing agent with a styrene co-polymer forms the subject matter of the co-pending application of Britton and Marshall, Serial No. 209,736, filed May 24, 1938.

A third method which may be employed in preparing the new compositions comprises mechanically mixing the finely divided co-polymer with the plasticizing agent in a Banbury or other suitable mixer until a homogeneous composition is obtained.

The following examples illustrate a number of ways in which the principle of the invention has been applied, but are not to be construed as limiting the same.

*Example 1*

Compositions comprising the co-polymer of styrene and the di-cinnamate of 1.4-dioxanediol-2.3 plasticized with various di-(chlorphenyl-) alkanes were prepared by polymerizing mixtures containing 50.0 parts of monomeric styrene, 0.25 part of the di-cinnamate of 1.4-dioxanediol-2.3, and 5.0 parts of the plasticizing agent. The polymerization was carried out by heating the mixtures at 100° C. for 7 or 14 days. All of the compositions so prepared were clear transparent resins which were insoluble in alcohol but capable of being swelled to insoluble gels by benzene. These products were ground, dried, and molded into test specimens which were tested for mechanical strength, hardness, and heat resistance. The data obtained, together with comparative data on the unplasticized co-polymer as well as data on the co-polymer plasticized with the known plasticizing agent, diphenyl propane, are present in Table 1 below:

*Table 1*

| Run No. | Co-polymerizing agent | | Plasticizing agent | | Polymerization | | Molding temp., °C. | Impact strength, in. lbs. | Tensile strength, lbs./sq. in. | Hardness (shore) | Heat Distortion, °C. | Softening point, °C. |
|---|---|---|---|---|---|---|---|---|---|---|---|---|
| | Name | Per cent | Name | Per cent | Time, hours | Temp., °C. | | | | | | |
| 1 | Di-cinnamate of 1.4-dioxanediol-2.3. | 0.5 | | | 168 | 100 | 160 | 0.9 | 6,900 | 80 | 77 | 110 |
| 2 | ___do___ | 0.5 | 1.2 di-phenyl propane | 9.0 | 168 | 100 | 150 | 0.9 | 5,750 | 75 | 48 | 100 |
| 3 | ___do___ | 0.5 | 1.2-di-(4-chlorphenyl-) ethane. | 9.0 | 168 | 100 | 160 | 2.1 | 8,600 | 80 | 64 | 104 |
| 4 | ___do___ | 0.5 | 1.2-di-(4-chlorphenyl-) propane. | 9.0 | 168 | 100 | 160 | 1.1 | 7,200 | 71 | 58 | 110 |
| 5 | ___do___ | 0.5 | 1.2-di-(4-chlorphenyl-) isobutane. | 9.0 | 336 | 100 | 160 | 1.0 | 8,400 | 83 | 64 | 111 |
| 6 | ___do___ | 0.5 | 1.2-di-(2.5-dichlorphenyl-) propane. | 9.0 | 168 | 100 | 160 | 1.9 | 9,600 | 74 | 76 | 116 |
| 7 | ___do___ | 0.5 | 1.2-di-(3.4-dichlorphenyl-) propane. | 9.0 | 168 | 100 | 150 | 0.8 | 7,000 | 76 | 69 | 115 |
| 8 | ___do___ | 0.5 | 1.2-tri-(2.4.6-trichlorphenyl-) ethane. | 9.0 | 336 | 100 | 160 | 0.8 | 8,300 | 80 | 68 | 90 |

*Example 2*

A number of compositions were prepared by polymerizing mixtures of monomeric tyrene and various co-polymerizing agents in the presence of 1.2-di-(4-chlorphenyl-) ethane as in Example 1. The plasticized compositions were ground, dried, and molded into test specimens. The test data obtained are tabulated below:

Table 2

| Run No. | Co-polymerizing agent | | Plasticizing agent | | Polymerization | | Molding temp., °C. | Impact strength, in lbs. | Tensile strength, lbs./sq. in. | Hardness (shore) | Heat distortion, °C. | Softening point, °C. |
|---|---|---|---|---|---|---|---|---|---|---|---|---|
| | Name | Percent | Name | Percent | Time, hours | Temp., °C. | | | | | | |
| 1 | Di-cinnamate of 1.4-dioxanediol-2.3. | 0.5 | 1.2-di-(4-chlorphenyl-)ethane | 9.0 | 168 | 100 | 160 | 2.1 | 8600 | 80 | 64 | 104 |
| 2 | Trimethallyl phosphate | 3.5 | ......do............ | 12.5 | 168 | 100 | 160 | 1.0 | 6400 | 74 | 63 | 124 |
| 3 | Diallyl maleate | 5.0 | ......do............ | 47.5 | 168 | 80 | *160 | 0.9 | 6400 | 83 | 91 | |
| 4 | 2-chlorallyl crotonate | 5.0 | ......do............ | 47.5 | 168 | 80 | *160 | 0.8 | 6600 | 83 | 92 | 212 |
| 5 | 2-chlorallyl furoate | 5.0 | ......do............ | 47.5 | 168 | 80 | *160 | 0.8 | 7100 | 84 | 89 | 225 |

* Polymer was extracted with acetone and dried before molding.

Example 3

The following Table 3 presents data illustrating the effect of the concentration of different plasticizing agents of the present type upon the physical properties of several styrene co-polymers. In each case, a mixture of monomeric styrene, the co-polymerizing agent, and the plasticizing agent was polymerized under the conditions indicated in the table, after which time the polymerized mass was ground, dried, molded to form the test specimen, and the properties of the latter were determined.

Table 3

| Run No. | Co-polymerizing agent | | Plasticizing agent | | Polymerization | | Molding temp., °C. | Impact strength, in. lbs. | Tensile strength, lbs./sq. in. | Hardness (shore) | Heat distortion, °C. | Softening point, °C. |
|---|---|---|---|---|---|---|---|---|---|---|---|---|
| | Name | Percent | Name | Percent | Time, hours | Temp., °C. | | | | | | |
| 1 | Di-cinnamate of 1.4-dioxanediol-2.3. | 0.5 | | | 168 | 100 | 160 | 0.9 | 6900 | 80 | 77 | 110 |
| 2 | ......do............ | 0.5 | 1.2-di-(4-chlorphenyl-)ethane. | 1.0 | 168 | 100 | 160 | 1.1 | 6600 | 86 | 84 | 117 |
| 3 | ......do............ | 0.5 | ......do............ | 4.5 | 168 | 100 | 160 | 2.7 | 6700 | 87 | 78 | 99 |
| 4 | ......do............ | 0.5 | ......do............ | 9.0 | 168 | 100 | 160 | 2.2 | 6400 | 84 | 67 | 98 |
| 5 | ......do............ | 0.5 | ......do............ | 13.0 | 168 | 100 | 160 | 0.8 | 5400 | 78 | 60 | 82 |
| 6 | ......do............ | 0.4 | ......do............ | 16.5 | 168 | 100 | 160 | 0.8 | 4800 | 75 | 49 | 74 |
| 7 | ......do............ | 0.5 | 1.2-di-(2.5-dichlorphenyl-)propane. | 1.0 | 168 | 100 | 160 | 1.6 | 9600 | 76 | 88 | 127 |
| 8 | ......do............ | 0.5 | ......do............ | 4.5 | 168 | 100 | 160 | 1.8 | 9500 | 76 | 78 | 116 |
| 9 | ......do............ | 0.5 | ......do............ | 9.0 | 168 | 100 | 160 | 1.9 | 9600 | 74 | 76 | 116 |
| 10 | ......do............ | 0.5 | ......do............ | 13.0 | 168 | 100 | 160 | 1.4 | 8800 | 67 | 65 | 118 |
| 11 | ......do............ | 0.4 | ......do............ | 16.5 | 168 | 100 | 160 | 1.1 | 6600 | 71 | 57 | 116 |
| 12 | Trimethallylphosphate. | 4.0 | | | 168 | 100 | 160 | 1.0 | 7300 | 84 | 83 | 105 |
| 13 | ......do............ | 4.0 | 1.2-di-(4-chlorphenyl-) ethane. | 1.0 | 168 | 100 | 160 | 1.6 | 7400 | 87 | 67 | |
| 14 | ......do............ | 4.0 | ......do............ | 4.5 | 168 | 100 | 160 | 0.9 | 6000 | 83 | 70 | |
| 15 | ......do............ | 4.0 | ......do............ | 9.0 | 168 | 100 | 160 | 1.0 | 6400 | 74 | 63 | 124 |
| 16 | ......do............ | 4.0 | ......do............ | 12.5 | 168 | 100 | 160 | 1.1 | 7600 | 70 | 50 | 104 |
| 17 | ......do............ | 4.0 | ......do............ | 16.0 | 168 | 100 | 160 | 0.9 | 5800 | 64 | 44 | 96 |
| 18 | Di-cinnamate of 1.4-dioxanediol-2.3. | 0.5 | 1.2-di-(2.4.6-trichlorphenyl-)ethane. | 0.5 | 336 | 100 | 160 | 1.6 | 7800 | 84 | 81 | 99 |
| 19 | ......do............ | 0.5 | ......do............ | 1.0 | 336 | 100 | 160 | 1.4 | 8500 | 87 | 83 | 102 |
| 20 | ......do............ | 0.5 | ......do............ | 2.5 | 336 | 100 | 160 | 1.2 | 9900 | 84 | 80 | 103 |
| 21 | ......do............ | 0.5 | ......do............ | 5.0 | 336 | 100 | 160 | 1.3 | 8700 | 79 | 77 | 98 |
| 22 | ......do............ | 0.5 | ......do............ | 9.0 | 336 | 100 | 160 | 0.8 | 8300 | 80 | 68 | 90 |

Example 4

A mixture of 200 parts of momomeric styrene and 1 part of the di-cinnamate of 1.4-dioxanediol-2.3 was polymerized by heating at 125° C. for 3 days. The resinous polymer obtained was insoluble in ethanol and acetone, but was capable of being swelled to an insoluble gel in benzene and similar aromatic hydrocarbon solvents. Approximately 20 parts of this co-polymer was added in finely divided form to about 300 parts of a 3 per cent benzene solution of 1.2-di-(4-chlorphenyl-) ethane. The mixture was allowed to stand for several hours, whereby the co-polymer swelled to a firm gel, after which the benzene was evaporated off and the mixture dried under vacuum at 80° C. The co-polymer was obtained as a resinous mass having the plasticizer uniformly incorporated therein. A molded test specimen was considerably less brittle and molded more readily than the unplasticized co-polymer. It has a tensile strength of about 3900 lbs./sq. in. and a Shore hardness of about 80.

The invention is capable of many modifications and is not limited by the examples given above. For example, the polymerization of a mixture of styrene, a co-polymerizing agent, and one or more of the new plasticizing agents may be carried out in the presence of solvents, emulsions, catalysts such as benzoyl peroxide or strong mineral acids, etc. to obtain a variety of useful products. If desired, various dyes, pigments, fillers, etc. may be incorporated with the new products before molding to produce decorative effects or to modify the physical properties of the molded product.

Other modes of applying the principle of our invention may be employed instead of those explained, change being made as regards the process of the ingredients employed, provided the process or the ingredients stated by any of the following claims of the equivalent of such process or ingredients be employed.

We therefore particularly point out and distinctly claim as our invention:

1. A composition of matter comprising a co-polymer of styrene and, as a plasticizing agent therefor, a di-(halophenyl-) alkane.

2. A composition of matter comprising a co-polymer of styrene and, as a plasticizing agent therefor, a di-(halophenyl-) alkane having the formula

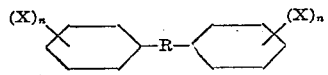

wherein R represents an alkylene radical, X represents a substituent selected from the group consisting of chlorine and bromine, and $n$ represents an integer not greater than 5.

3. A composition of matter comprising an insoluble co-polymer of styrene and, as a plasticizing agent therefor, a di-(halophenyl-) alkane having the formula

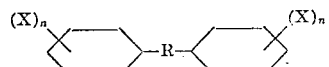

wherein R represents an alkylene radical, X represents a substituent selected from the group consisting of chlorine and bromine, and $n$ represents an integer not greater than 5.

4. A composition of matter comprising a co-polymer of styrene and, as a plasticizing agent therefor, a di-(chlorphenyl-) alkane having the formula

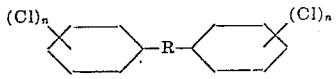

wherein R represents an alkylene radical and $n$ represents an integer not greater than 3.

5. A composition of matter comprising an insoluble co-polymer of styrene and, as a plasticizing agent therefor, a di-(chlorphenyl-) alkane having the formula

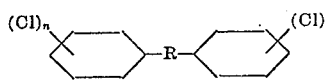

wherein R represents an alkylene radical and $n$ represents an integer not greater than 3.

6. A composition of matter comprising an insoluble co-polymer of styrene and, as a plasticizing agent therefor, a di-(chlorphenyl-) alkane having the formula

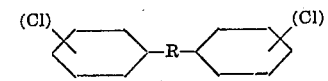

wherein R represents an alkylene radical containing not more than 5 carbon atoms.

7. A composition of matter comprising an insoluble co-polymer of styrene and the dicinnamate of 1.4-dioxanediol-2.3 and as a plasticizing agent therefor, a di-(chlorphenyl-) alkane having the formula

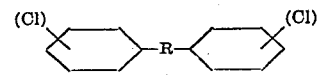

wherein R represents an alkylene radical containing not more than 5 carbon atoms.

8. A composition of matter comprising an insoluble co-polymer of styrene and, as a plasticizing agent therefor, 1.2-di-(4-chlorphenyl-) ethane.

9. A composition of matter comprising an insoluble co-polymer of styrene and, as a plasticizing agent therefor, 1.2-di-(4-chlorphenyl-) propane.

10. A composition of matter comprising an insoluble co-polymer of styrene and, as a plasticizing agent therefor, 1.2-di-(4-chlorphenyl-) isobutane.

11. A composition of matter comprising the insoluble co-polymer of styrene and diallyl maleate plasticized with 1.2-di-(4-chlorphenyl-) ethane.

12. A composition of matter comprising the insoluble co-polymer of styrene and the dicinnamate of 1.4-dioxanediol-2.3 plasticized with 1.2-di-(4-chlorphenyl-) ethane.

13. A composition of matter comprising the insoluble co-polymer of styrene and trimethallyl phosphate plasticized with 12.-di-(4-chlorphenyl-) ethane.

14. The process which comprises polymerizing styrene in the presence of a co-polymerizing agent and a di-(halophenyl-) alkane.

15. The process which comprises polymerizing styrene in the presence of a co-polymerizing agent and a di-(chlorphenyl-) alkane having the formula

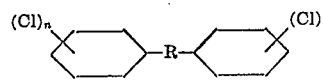

wherein R represents an alkylene radical containing not more than 5 carbon atoms and $n$ represents an integer not greater than 3.

16. The process which comprises polymerizing styrene in the presence of a co-polymerizing agent and a di-(chlorphenyl-) alkane having the formula

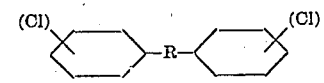

wherein R represents an alkylene radical containing not more than 5 carbon atoms.

EDGAR C. BRITTON.
GERALD H. COLEMAN.